United States Patent
McBride et al.

(10) Patent No.: US 7,149,218 B2
(45) Date of Patent: Dec. 12, 2006

(54) CACHE LINE CUT THROUGH OF LIMITED LIFE DATA IN A DATA PROCESSING SYSTEM

(75) Inventors: Chad B. McBride, Rochester, MN (US); Jonathan W. Byrn, Kasson, MN (US); Robert N. Broberg, III, Rochester, MN (US); Gary P. McClannahan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 941 days.

(21) Appl. No.: 10/006,604

(22) Filed: Dec. 5, 2001

(65) Prior Publication Data

US 2003/0103526 A1    Jun. 5, 2003

(51) Int. Cl.
*H04L 12/28* (2006.01)
(52) U.S. Cl. .................. 370/392; 711/114; 370/428
(58) Field of Classification Search ................ 370/466, 370/412, 428, 389, 352, 392, 395.52, 395
See application file for complete search history.

(56) References Cited

U.S. PATENT DOCUMENTS

| | | | | |
|---|---|---|---|---|
| 5,428,609 A * | 6/1995 | Eng et al. | .................. | 370/392 |
| 5,533,021 A | 7/1996 | Branstad et al. | ........... | 370/60.1 |
| 5,537,408 A | 7/1996 | Branstad et al. | .............. | 370/79 |
| 5,652,749 A | 7/1997 | Davenport et al. | ......... | 370/466 |
| 6,075,790 A * | 6/2000 | Lincoln et al. | ............. | 370/398 |
| 6,246,683 B1 * | 6/2001 | Connery et al. | ............ | 370/392 |
| 6,311,212 B1 * | 10/2001 | Chong et al. | ................ | 709/212 |
| 6,539,460 B1 * | 3/2003 | Castelli et al. | .............. | 711/154 |
| 6,650,642 B1 * | 11/2003 | Sugai et al. | ................. | 370/392 |
| 6,700,888 B1 * | 3/2004 | Jonsson et al. | ............. | 370/392 |
| 6,754,662 B1 * | 6/2004 | Li | .............................. | 707/101 |
| 6,832,297 B1 * | 12/2004 | Pfister et al. | ............... | 711/144 |
| 6,912,223 B1 * | 6/2005 | Sloane | ...................... | 370/401 |
| 6,947,971 B1 * | 9/2005 | Amos | ......................... | 709/213 |
| 6,956,853 B1 * | 10/2005 | Connery et al. | ............ | 370/392 |
| 2002/0027901 A1 * | 3/2002 | Liu et al. | .................... | 370/352 |
| 2002/0027920 A1 * | 3/2002 | Tai et al. | ................. | 370/395.6 |
| 2003/0067934 A1 * | 4/2003 | Hooper et al. | .............. | 370/428 |
| 2004/0117438 A1 * | 6/2004 | Considine et al. | .......... | 709/203 |

* cited by examiner

*Primary Examiner*—Doris H. To
*Assistant Examiner*—Steve Blount
(74) *Attorney, Agent, or Firm*—Karuna Ojanen

(57) ABSTRACT

A method and apparatus for a cache line cut through reduces the latency and memory bandwidth of a data processing system. By cutting through or forwarding a cache line to the next processing element, data that has been read from a local memory into a local cache and altered by a processing element need not be restored to the local memory before it is sent to its destination target processing element. By eliminating the write back to the local memory for direct write through to the destination, performance is increased because the bandwidth and latency are decreased. In a preferred embodiment, the processing elements may be contained within a network processor and the altered data may be a header in one network protocol which needs to be modified to another protocol before transfer of the data along the network. Transfer of the data may be to another network processor, another processing element, or to another memory.

19 Claims, 4 Drawing Sheets

CACHE LINE CUT THROUGH OF LIMITED LIFE DATA IN A DATA PROCESSING SYSTEM

TECHNICAL FIELD

This invention relates generally to the field of data transfer in a data processing system and more particularly relates to techniques to decrease the bandwidth and latency of data transfers to and from processing elements and memory systems when the data being transferred is of a short duration and is no longer required by the source of the data, whether it be a processing element or memory.

BACKGROUND OF THE INVENTION

Computer architecture refers to the physical structure and interconnections of the registers, logical and arithmetic units, control units, and other hardware within a computer. All computers have at least one processor and more complex computers, such as servers, have many processors working together. Also, there are at least two kinds of memory devices associated with the computer: an internal volatile memory called random access memory which is erased when the computer is turned off; and an external memory, called a hard drive, which permanently stores the programs, also called applications, to be executed by a processor when called. Of course, there are a number of peripheral devices such as monitors, Internet connections, keypads, mouses, other pointing devices, other optical and magnetic drives, connections to other computers, etc.

A processing element of a computer retrieves data in the form of applications, programs, or data from the external memory into an internal memory. When data and/or instructions are needed for the application, the processing element may retrieve the data/instructions from internal memory to its registers for arithmetic and logical processing. Now that processing speeds are faster and faster, computer architects have directed an aspect of research and development into keeping the processor occupied and its registers filled for the next operation. One of many approaches taken by computer architects has been to minimize the time required to retrieve data/instructions from external and internal memory into the processor's registers. Incorporating smaller high speed memory units called caches nearer the memory is an implementation of this approach. These caches, moreover, may be hierarchical meaning that a level one (L1) cache is nearest to the processing element and is very fast which may be accessed in only one or very few processing cycles. There may be a L1 cache for instructions and a different L1 cache for data. There also may be level two (L2) and/or level three (L3) caches with the higher number denoting a larger, more distant, and perhaps slower cache but still closer and faster than either internal or external memory. Thus, when a processing element needs data/instructions which is not readily available in its registers, it accesses its nearest cache by generating a control signal to access the cache directory and the data array in which the data is actually stored.

Computer architectures come in a myriad of arrangements today wherein the multiple processors may share caches and/or memory. A processor's memory may be distributed in that each processing element may be connected on an internal bus to a local memory subsystem with unique addresses. The local memory of another processing element might have different addresses so that the processing elements may access each other's local memory for the address stored in that particular local memory over some interconnect fabric.

Managing data in caches has become a science in and of itself. There is always a cache management scheme, an example of which is that the most recently used (MRU) data and/or instructions are stored in the nearest cache. When the nearest cache gets full, then the oldest data/instructions may spill over to fill the next cache and so on. There are other cache management schemes. Caches, moreover, may be accessed by different processing elements so that the same data/instructions, whether accessed by different processing elements or within different caches, must be checked before use to determine if the data is valid. For instance, if processing element 1 has data in its cache and processing element 2 is executing an operation to change that data, then processing element 1 should wait until processing element 2 has completed its manipulation to guarantee that processing element 1 will not access stale data. Maintaining valid data/instructions in the various caches is accomplished by a cache coherency scheme, an example of which is MESI. Each entry in a cache is tagged to indicate its state, i.e., whether the data/instruction is Modified, Exclusive, Shared, or Invalid, hence MESI. Modified data is data that is being modified by a processing element and so another processing element should wait until the modification is complete. Exclusive data means that the processing element having the data in its cache has exclusive control of the data. Shared data is shared by other processing elements; and Invalid data should not be used by any processing element. There are many cache coherency schemes; the MESI protocol above is only one example.

A key problem in processing any Shared data is how many times the data needs to be copied while processing the data. The greater the number of copies that need to be made for multiple processing elements, the more memory bandwidth is consumed and the greater the latency of processing. Memory bandwidth and latency of processing are critical performance variables in many applications.

A typical system of processing elements and accessible memory units is shown in FIG. 1. Typically data is transferred in packets, also called cells. Each packet or cell may have a header and a body as determined by the protocol of the data transfer method and mechanism. For instance, in an asynchronous transfer mode (ATM), a cell consists of 53 octets or bytes in which the first five bytes contain header information and the remaining forty-eight bytes contain the body, also called the payload or data. The header may contain such information as an identifier or address of the next destination and/or the sender of the packet; the type of payload associated with the header, e.g., is the payload user data or control data; is the payload string or integer type; an error control check; a priority check; the nature of the request associated with the data, e.g., is the request a "ping", a "query", or a "reply"; etc. If the data is too large to be transmitted in one single packet, it will be split into packets of convenient size, each with a special unique packet header to enable them to be reassembled at the receiving end.

With reference to FIG. 1, a packet comprising a packet header 122 and body 124 are received along path 1 into a packet memory 120 through a network interface and receive logic 110 of a typical packet receiver. A packet is synonymous with a frame, both of which may consist of multiple data cells. The frame header 122 is pulled from memory 120 into a bridge services processor 130, such as an input/output processor, for memory translations along step 2. The local processing element 150 stores the header data 122 in its cache 140 from local memory 120 for examination and/or modification along path 4. When/if all parts have been received, the header 122 and body 124 are concatenated and decoded as a normal packet in the processing element 150 along path 5. The body 124 may be sent to the next processing element's memory subsystem 180 along path 3 depending on the application.

The packet header modifications are completed and a writeback of the header is triggered first to the current processor's cache 140 along path 6 and then to the current memory subsystem 120 along paths 7 and 8. The local processing element 150 takes care of the routine header manipulations but sends the new or different headers to another processing element 190 with a different memory subsystem 180. When the local processing element 150 forwards the modified header 122 to another processing element 190 it must cast out the modified header from its cache 140. The header then must then be read from memory 120 for the next processing element. From packet memory 120, the recombined packet enters a memory engine along path 9, such as the bus interface Direct Memory Access (DMA) engine 160 which manages memory access. The bus interface DMA engine 160 notifies the next processing element 190 when each or both the header/body 122/124 is complete. If the main body of data 124 needs to go to the next processing element 190 and has not yet been transferred, its transfer is now triggered. This transfer may be with the header or roughly in parallel with the transfer of the modified header 122. The next processing element 190 is notified that the header, the body or both are available in its memory 180 and proceeds.

There is thus a need in the industry to increase the memory bandwidth by decreasing the amount of traffic on an interconnect and/or internal bus system in a data communications system by eliminating redundant or unnecessary memory accesses.

SUMMARY OF THE INVENTION

These needs and others that will become apparent to one skilled in the art are satisfied by a method to forward data in a data processing system, comprising the steps of receiving network data; separating the network data into portions which will be modified and into portions which will not be modified; storing both portions of the data in a local memory; forwarding the modifiable portions of the data to a cache associated with a processing element requesting at least the modifiable portion of the data; determining a destination of the modifiable portion; modifying the modifiable portions within the processing element; writing back the modified portion of the packet to the destination bypassing the local memory. The modification may comprise updating the source address and destination address in the modifiable data. In one embodiment, the modifiable portion of the network data is a packet header of one network protocol which is modified to that of another network protocol, such as ATM, ethernet, point-to-point (PPP) protocol or internet protocol (IP).

The modification may occur in a network processor, or a local processing element, or an embedded processor in an application specific integrated circuit, ASIC. If the local processing element and the destination processing element have different views of memory, the method may further comprise translating a memory address.

The invention may further be considered an apparatus for data communications, comprising: a network interface through which to receive incoming data comprised of at least one packet, the data packet having a modifiable portion and a portion that need not be modified; a local memory connected to the network interface, the local memory for receiving the data and storing the modifiable portion from the portion that need not be modified; a modifier which updates the modifiable portion of the data packet; a bus interface; and an interconnect fabric connected to the bus interface by which to forward the modifiable portion and the portion of the data that need not be modified to its destination. The incoming data may be digital and/or analog, and may be electrical and/or optical data.

The invention may also be considered a memory bypass mechanism, comprising a means to receive optical and/or digital data; a means to separate the received data into a modifiable portion and a non-modifiable portion; a means to store the received data in a first memory; a means to forward the modifiable portion of the data to a modifying means; a means to forward the non-modifiable portion to a destination; a means to modify the modifiable portion; and a means to forward the modified portion of data directly to its destination bypassing storing the modified portion in the first memory.

The modifiable portion of the received data may be a header stating a network protocol of the data and/or a destination address of the received data. The received header may be of a first network protocol and the modified header may be of a second network protocol; the network protocols selected from the group consisting of: asynchronous transfer mode, ethernet, Internet protocol, and Point-to-Point protocol.

The modifying means may be a processing element in a network processor. The destination may be a different processing element in the network processor; or a second memory.

BRIEF DESCRIPTION OF THE DRAWING

The novel features believed characteristic of the invention are set forth in the claims. The invention itself, however, as well as a preferred mode of use, objects and advantages thereof, will best be understood by reference to the following detailed description of an illustrative embodiment when read in conjunction with the accompanying Drawing, wherein:

DETAILED DESCRIPTION OF THE INVENTION

Figure 2:
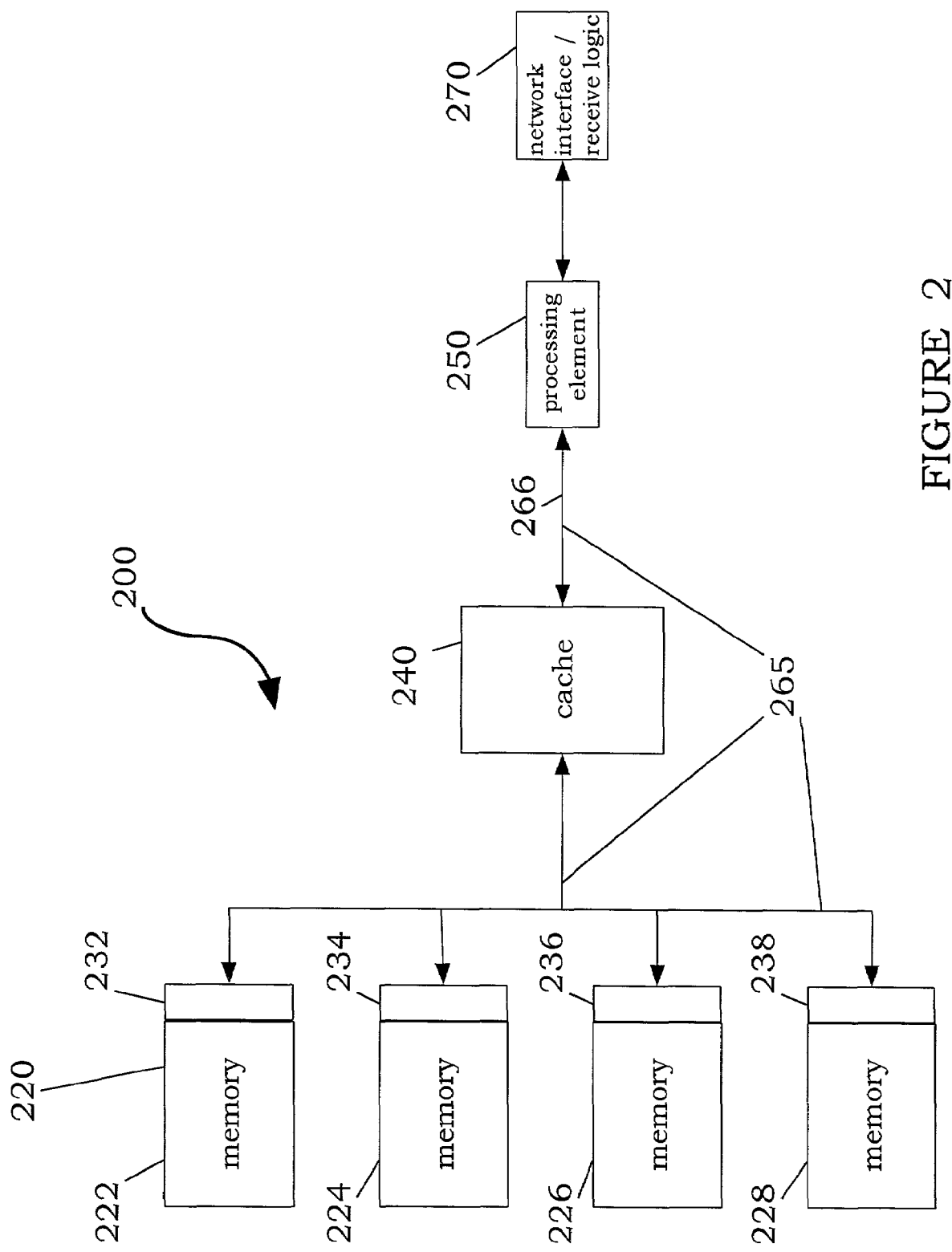
FIG. 2 is a high level block diagram of a data communications system having multiple processing elements sharing a cache and memory capable of implementing an embodiment of the invention.

Referring to the Drawing, wherein like numbers denote like parts throughout the several views, FIG. 2 shows a high-level block diagram of processing system 200, consistent with the preferred embodiment. Processing system 200 comprises, inter alia, a processing element 250; an SRAM memory subsystem 220 having one or memory chips 222, 224, 226, and 228, each with their own memory controller 232, 234, 236, and 236; and a cache 240. The various devices may communicate with each other via a communications bus 265, which may include an internal processor bus 266 between memory 222 and the processing element 250.

The processing element 250 may be a general-purpose programmable processor, based on a PowerPC architecture, a microprocessor, input/output processor (IOP), or it may be as simple as a state machine in which data is manipulated. In the event that the processing element 250 is a fully structured Power PC processor or a microprocessor having a different architecture, the processor may have an operating system and applications residing in its memory subsystem 220. Operating system may provide, inter alia, functions, such as device interfaces, management of memory pages, management of multiple tasks, etc. as is well known in the art. Processing element 250 is suitably programmed to carry out the preferred embodiment, as described in more detail herein below. In the alternative, the function of figures could be implemented by control circuitry through the use of logic gate, programmable logic devices, or other hardware components in lieu of a processor-based system.

Memory subsystem 220 may be as simple as a single register directly accessible by the processing element 250 or may comprise a static random-access semiconductor memory array for storing data and programs located off chip. Memory 220 is often arranged in a hierarchy of caches and other memory devices. In the preferred embodiment, the processing system 200 is a network processor with a cache 240 to which multiple processing elements 250 within the network processor is connected. The cache 240 may be as simple as a buffer or as complex as a four-way set associative cache. One implementation of the embodies a 32K write-through cache having a last recently used (LRU) replacement algorithm. One skilled in the art will understand that the invention is not limited to a particular embodiment of a cache or a buffer, nor is it dependent upon a replacement algorithm.

Network interface and receive logic 270 may support the attachment of a single or multiple terminals, and may be implemented as one or multiple electronic circuit cards or other units. Network interface and receive logic 270 may further provide a physical connection for transmission of data to and from the Internet, and could use any various available protocols and technologies, including but not limited to asynchronous transmission mode. For example, network interface and receive logic 270 may comprise an optoelectronic transceiver for the transmission and receipt of optical data; alternatively, network interface and receive logic 270 may be a copper transceiver through which access to a network is achieved. Data processing system 200 may also be connected to another data processing system via a local area network or a wide area network using an Ethernet, Token Ring, or other protocol. Alternatively, access to other networks may be provided through wireless, or other types of connection.

Figure 3:
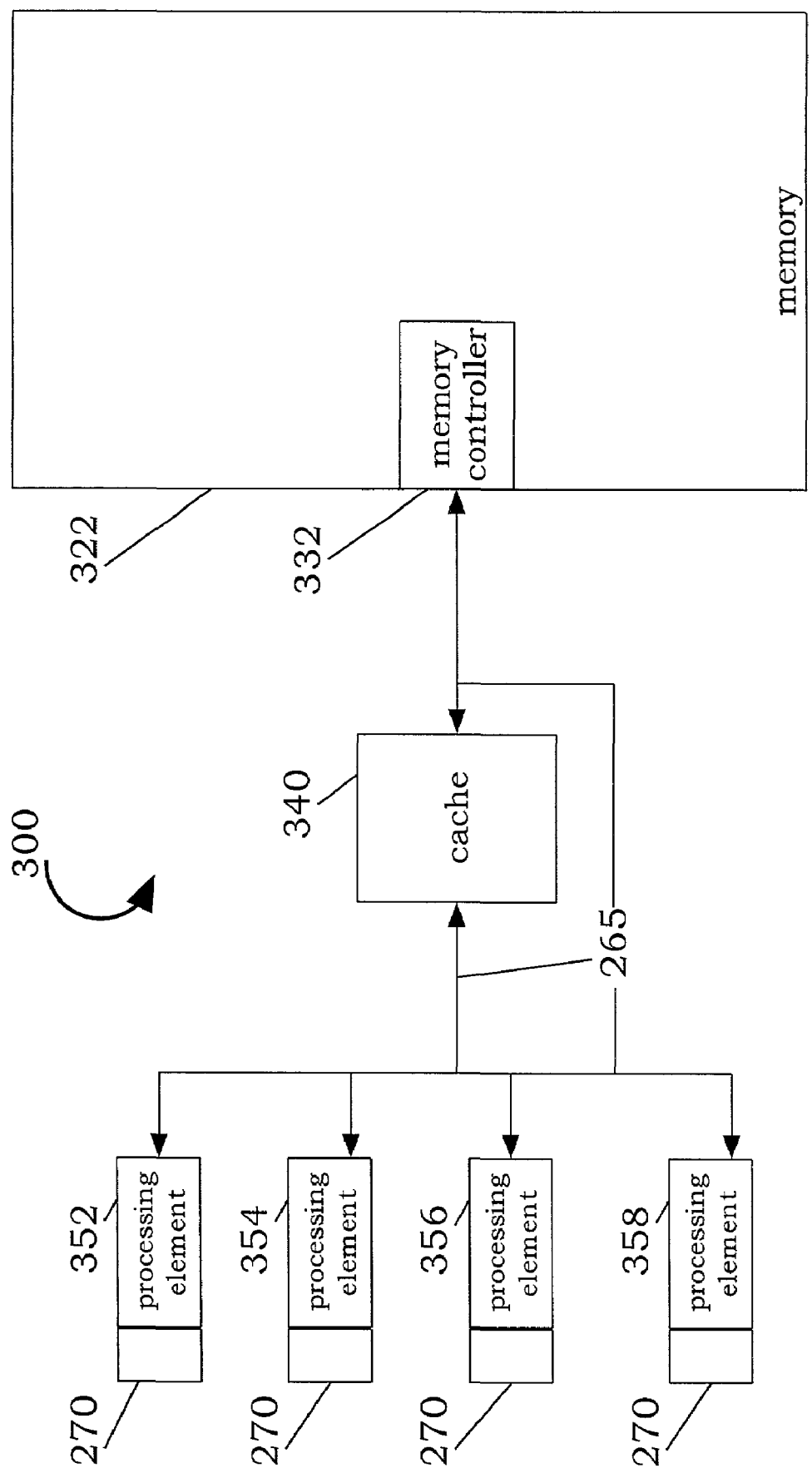
FIG. 3 is a high level block diagram of a data communications system having multiple memory subsystems sharing a cache and a processing element capable of implementing an embodiment of the invention.

FIG. 3 illustrates another embodiment of the invention. FIG. 3 illustrates a number of processing elements 352, 354, 356, and 358, each of which may have its own or a shared network interface and receive logic 270, or a single network interface and receive logic 270 connected to a network which may be shared amongst the processing elements 352–358. Preferentially, each processing element is a component, such as a segmentation layer, or a cell scheduler, or a reassembly unit in a network processor 300, as disclosed in U.S. Pat. No. 5,652,749 issued Jul. 29, 1997, U.S. Pat. No. 5,537,408 issued Jul. 16, 1996, and U.S. Pat. No. 5,533,021 issued Jul. 02, 1996, all of which are entitled *Apparatus and Method for Segmentation and Time Synchronization of the Transmission of Multiple Program Multimedia Data Stream* and which are owned by the same assignee as this patent herein and which are hereby incorporated by reference in their entireties. One cache 340 within the network or other processor then services each of these processing elements and one memory 322 with its memory controller 332 is connected to the cache 340.

FIGS. 2 and 3 are intended to represent variations of the same components. For example, processing elements 352–358 may indeed represent a full blown 4-way processing system accessing a single cache, whether it be a near or a far cache, which in turn accesses one or more memory subsystems. As mentioned, data processing system 200, 300 need not be limited to high end or to personal data processing systems, it may be a smaller data processing system, such as notebook or laptop computer. Finally, data processing system 200, 300 need not be a computer at all. The convergence of computing, telecommunications and consumer electronics is causing a tremendous growth in the number and variety of computer network client devices. This network architecture enables the multitude of emerging devices including routers, switches, hubs, servers, etc, which may be connected to laptops, sub-notebooks, handheld computers, such as personal digital, and other simpler appliance-like client devices with less memory. Examples of other intended data processor systems 200, 300 which list is not intended to be exhaustive but merely exemplary, include a network terminal or a thin client or other terminal-like devices having smaller memory; voice response units (VRUs); terminals; world wide web browsers; and even pervasive mobile devices, such as personal digital assistants, pagers, and cellphones connected to various networks. Such special-purpose devices for accessing the world wide web, such as an network access box for a television set, or a portable wireless web accessing device, which can process and transfer network data is also intended to be within the scope of a data processing system 200, 300. It is fully intended that data processing system 200, 300 include any electronic device having at least one processing element with a memory subsystem capable of transferring network data to other processing elements. Aspects of the preferred embodiment pertain to specific method steps implementable on a data processing system 200, 300 as a network processor which is physically close to a network such that it can process, classify, examine, and modify network data without impeding its progress along the network.

The invention may be a method and an apparatus to cut through or forward transient data directly to any of a plurality of different memory subsystems from a source's cache before the modified or new data is written back to the source's memory. Transient data is characterized by its short life span and the irrelevance of its coherency in the source of the transient data, i.e., the source of the data may never need the data again. Similarly, the invention may be considered a method and an apparatus to forward data to or from any of a plurality of different processing elements from a source's cache without having to write the data to the source's processing element's memory. The cache 240 may be a write-through cache with a LRU replacement algorithm but need not be, as previously stated. Simply put, data that is read into the cache 240 from one memory subsystem (processing element) is "written back" to a different memory subsystem (processing element).

The preferred embodiment of the invention exploits the limited life nature of data in a communications environment. Network data may be extremely transient with respect to an internal processor's data, i.e., the purpose of a network processor is to rapidly receive and transmit data from numerous sources and destinations, each of which may have any number of different protocols. There are many times where the coherency state of the data is irrelevant to the memory source of the data because the data will never be used again by the source processing element but instead, the data will be sent onto another processing element for further processing. Depending upon the flexibility and granularity desired, there are a number of embodiments but quite simply, all the embodiments revolve around the broad implementation of updating only those portions of the incoming and outgoing data that need to be updated in order to find the next destination and then forwarding the updated data directly to the source before maintaining cache coherency, if need be. Such updating can occur within the processing element in the logic that services the cache or a part of the cache write mechanism, as in a bridge services processor. One example of this is the case of header examination and manipulation in a network processor of an ATM switching system.

If the local processing element and the next processing element, moreover, do not share the same view of memory, then an additional address translation to convert the local address within the cache to an address understandable by the next processing element's view of memory may occur. The logic that is performing the address translation then sends the cache line data to the next processing element across the interconnect fabric. This address translation technology could be as simple as an additive relocation up to a more complex scheme where the new addresses are created from a free list of the next processing element's pages/buffers.

Figure 4:
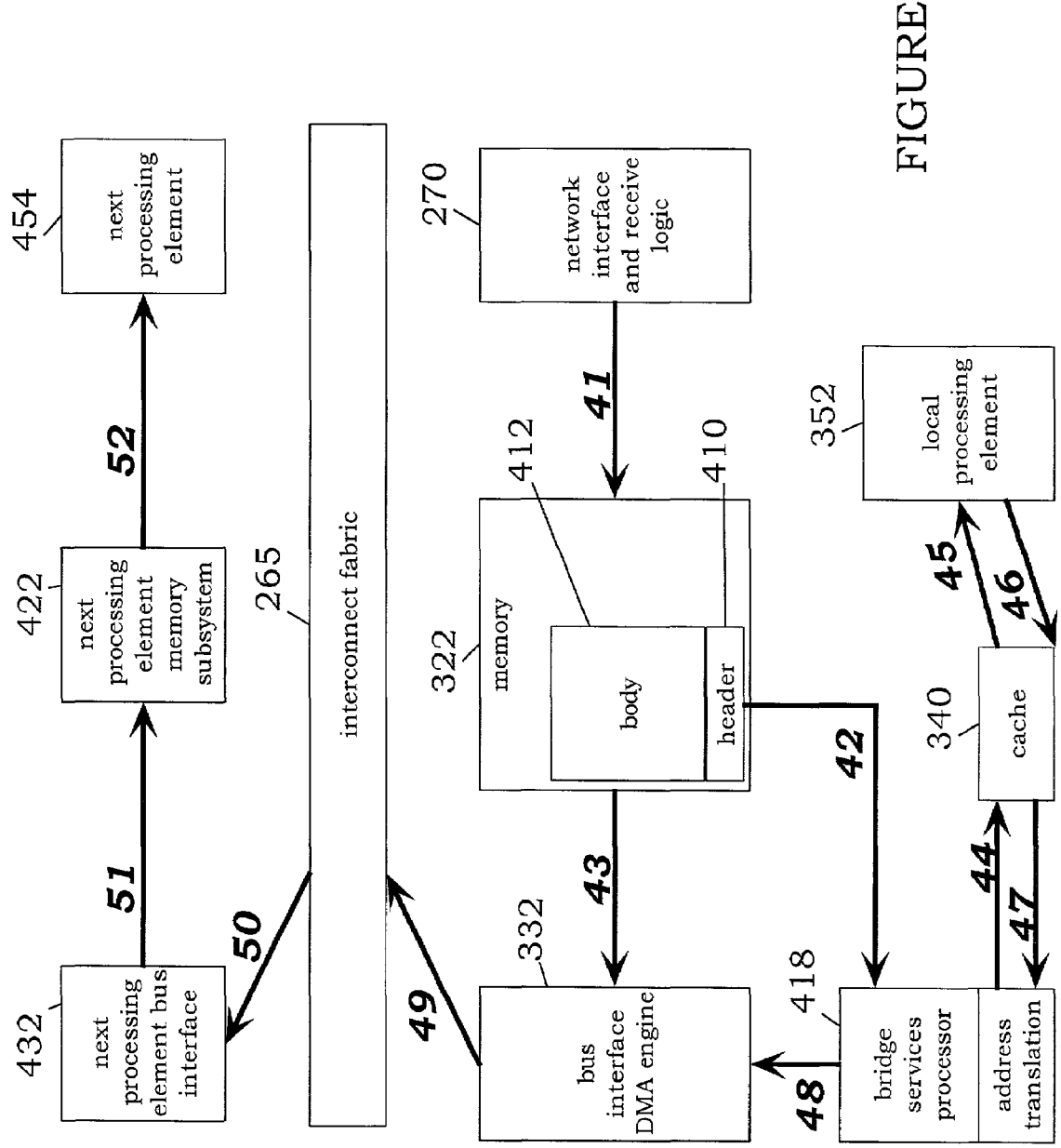
FIG. 4 is a high level block diagram of the transfer of data packets in a system having multiple processing elements, each with their own memory subsystem in accordance with an embodiment of the invention. It is suggested that FIG. 4 be printed on the face of the patent.

With respect to FIG. 4, a packet header 410 and packet body 412, preferably an ATM packet, are received through the network interface and receive logic 270 along path 41 into packet memory 322. Packet memory 322 may be an off-chip SRAM. The local processing element 352 is notified when each or both of the packet header and body have arrived and are complete. By way of example only, the local processing element 352 may be a reassembly unit in a network processor, as in the patents incorporated by reference herein.

Along paths 42 and 44, the packet header 410 is pulled from memory 322 into the cache 340 at the local processing element's 352 request; however, the packet body 412 may, depending on the application, be sent to the memory subsystem 422, 432, of the next processing element 354 along path 43. Again, by way of example only, the next processing element may be a cell scheduler within the same network processor as the reassembly unit. Thus, a processing unit is intended to encompass any hardware that examines a portion of the data and makes a decision based on that portion of data.

The packet header 410 is stored in the cache 340 of the local processing element 352 along path 44. On path 45, the header 410 is accessed and manipulated by the local processing element 352. The packet header manipulation may be the modification or the creation of a completely new header as the data transfers from one network protocol to another, e.g., from/to Internet Protocol (IP), Ethernet, ATM, Point-to-Point Protocol (PPP), etc. One of skill in the art is aware of the many network protocols that can be used within the context of a network processor. After the packet header modifications are completed, a writeback of the packet header 410 is triggered along path 46 to the cache 340. At path 47, the target tag of modified packet header 410 may undergo some modification in order to identify the next processing element 354.

In accordance with the preferred embodiment of the invention, however, the writeback of the modified or new header 410 is directly sent to the new memory subsystem 422, 432 via one of the methods discussed above along paths 48 and 49. Now, if the main body 412 of data has not yet been transferred to the next processing element 354 as above and needs to be done, its transfer is now triggered along paths 43, 49, 50, and 51.

The next processing element 354 is notified that the header 410, the body 412, or both are available in its memory 422, 432 along path 51 and proceeds to retrieve the header if necessary along path 52.

Figure 1:
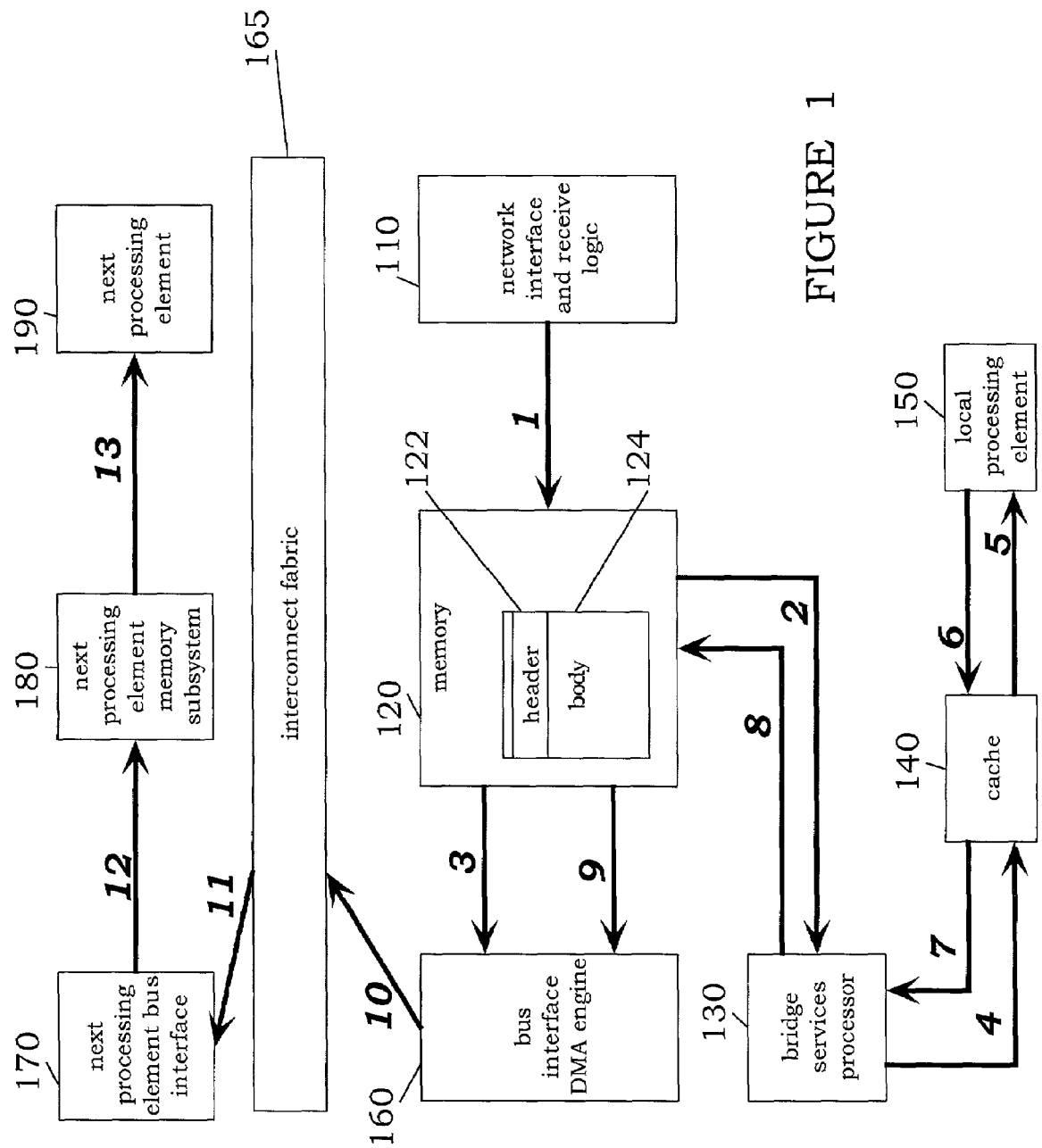
FIG. 1 is a high level block diagram of the transfer of data packets in a prior art system having multiple processing elements, each with their own memory subsystem.

For applications that have split processing of this nature, e.g., manipulation of the one part of the data does not require manipulation of another portion of the data, a number of advantages result from application of the embodiments described herein. The first advantage is that the burden on the local memory subsystem 322 is reduced. A second advantage is the reduction of latency by first eliminating the one-two hops that the header data would otherwise need to make, i.e., paths 8 and 9 of FIG. 1 are eliminated. Yet another advantage is that, where appropriate to the application, the body of the packet can be transferred to the next memory subsystem while the header processing is underway.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

What is claimed is:

1. A method to forward network data in a data processing system, comprising:
    (a) receiving network data into the data processing system, the data processing system comprising a plurality of processing elements, a local SRAM memory, and a cache connected to the local SRAM memory and the plurality of processing elements;
    (b) separating the network data into transient portions which are short-lived, and will be modified by one of the plurality of processing elements but whose modifications will not be needed by the data processing system and into portions which will not be modified;
    (c) storing both portions of the network packet in the local SRAM memory;
    (d) forwarding the transient portions of the network data to the cache connected to and associated with the plurality of processing elements, one of the plurality of processing elements requesting the transient portion of the data;
    (e) determining a next destination data processing system of the network data;
    (f) transferring the portion of the network data that are not modified to a next SRAM memory of the next destination data processing system;
    (g) modifying the transient portions within the requesting processing element;

(h) writing back the transient portion of the network data to the next SRAM memory of the next destination data processing system independently of transferring the nonmodifiable portion of the network data, and bypassing the local SRAM memory.

2. The method of claim 1, wherein the transient portion of the network data is a packet header of one network protocol which is modified to that of another network protocol.

3. The method of claim 2 wherein one network protocol is ATM.

4. The method of claim 2 wherein one network protocol is ethernet.

5. The method of claim 2 wherein one network protocol is PPP, point-to-point protocol.

6. The method of claim 2 wherein one network protocol is IP, internet protocol.

7. The method of claim 2, further comprising:
(a) translating an address if the requesting processing element and the next destination data processing system have different addresses of the local SRAM memory.

8. The method of claim 1, wherein the modification comprises updating an address to that of the next destination data processing system.

9. The method of claim 1, wherein the modification occurs in a network processor.

10. The method of claim 1, wherein the modification occurs in a local processing element.

11. The method of claim 1, wherein the modification occurs in an embedded processor in an application specific integrated circuit, ASIC.

12. A data processing system for data communications, comprising:
(a) a network interface through which to receive incoming data comprised of at least one data packet, the data packet having a modifiable portion and a portion that need not be modified;
(b) a local memory connected to the network interface, the local memory for storing the incoming data;
(c) a bus interface connected to the local memory which forwards the portion of the data packet that need not be modified to an interconnect fabric, independent of the modifiable portion of the data packet, and to a next local memory of a next processing element system;
(d) a cache in which to store the modifiable portion of the data racket;
(e) a modifier which receives the modifiable portion of the data packet from the cache, updates the modifiable portion of the data packet and forwards the updated modifiable portion of the data packet to the cache and the bus interface that transfers the updated modifiable portion of the data packet to the interconnect fabric, independent of the portion of the data packet that need not be modified, to the next local memory of a next processing element system.

13. The apparatus of claim 12, wherein the incoming data is digital electrical and/or optical data.

14. The apparatus of claim 12, wherein the incoming data is analog electrical and/or optical data.

15. A memory bypass mechanism, comprising:
(a) means to receive optical and/or digital data;
(b) means to separate the received data into a modifiable portion and a non-modifiable portion;
(c) means to store the received data in a local memory;
(d) means to forward the modifiable portion of the data to a cache associated with a plurality of modifying means;
(e) means to forward the non-modifiable portion to a next local memory of a destination means to receive the optical and/or digital data:
(f) means to modify the modifiable portion in one of the plurality of modifying means associated with and connected to the cache; and
(g) means to forward the modified portion of data to the cache and then directly to the next memory of the destination means bypassing storing the modified portion in the local memory.

16. The memory bypass mechanism of claim 15, wherein the modifiable portion of the received data is a header stating a network protocol of the data and/or a destination address of the received data.

17. The memoxy bypass mechanism of claim 16, wherein the received header is of a first network protocol and the modified header is a second network protocol.

18. The memory bypass mechanism of claim 17, wherein the first and second network protocols are selected from the group consisting of: asynchronous transfer mode, ethernet, Internet protocol, and Point-to-Point protocol.

19. The memory bypass mechanism of claim 15, wherein the modifying means is a processing element in a network processor.

* * * * *